UNITED STATES PATENT OFFICE.

GEORGE E. VAN DERBURGH, OF NEW YORK, N. Y.

IMPROVED COMPOSITION FOR ARTIFICIAL STONE.

Specification forming part of Letters Patent No. 62,165, dated February 19, 1867; antedated February 14, 1867.

*To all whom it may concern:*

Be it known that I, GEORGE E. VAN DERBURGH, of the city, county, and State of New York, have invented a new and useful Artificial Stone or Composition for Building and Ornamental Purposes, &c.; and I do hereby declare the following to be a full, clear, and exact description thereof.

The nature of my invention consists in the production of an artificial stone for building and other purposes by combining sand or other equivalent silicious matter with fluid, semi-fluid, or gelatinous silicate of lime, and, after molding the same into any desired form or shape, allowing it to harden, or by taking any combination of silex with caustic quicklime, and (with or without the application of heat) excluding atmospheric air therefrom, at the same time keeping the composition moist until silicate of lime has formed therein, finally allowing it to harden by exposure to the atmosphere.

In carrying my invention into effect, I take silicate of lime, obtained either by mixing a solution of lime with the alkaline silica or "water-glass" of commerce, or by the decomposition of silex in a caustic solution of lime, or in any other suitable manner, and mixing this silicate, in a semi-fluid state, with sand, scoria, or other pulverulent silicious matter, in the proportion of about one part of the silicate to ten of the sand, stir up the same thoroughly by any mechanical means, adding from time to time enough water, or, by preference, lime-water, to render the same sufficiently plastic. Instead, however, of obtaining this plastic combination of moist silicate of lime and silex by mixing the two elements each distinct from the other, as just described, I prefer, in ordinary cases, to obtain the same result by forming a silicate of lime upon each particle of the silex by mixing dry caustic or hydrated quicklime with moist sand in an air-tight cylinder, or by any other suitable means, in about the proportions of one part of lime and eight to ten of sand or other silicious material, and then, after reducing the mass, with water or condensed steam, to the consistency of a thick paste, permeate it from time to time (say, about once in every six hours, or oftener) with steam, either saturated or superheated, which, by imparting heat with moisture, will greatly hasten the formation of the silicate of lime.

Although I prefer steam for imparting heat and moisture to the mass, I do not limit myself thereto, but contemplate the employment of any other means which will effect this end.

After obtaining a plastic mixture of silex and silicate of lime in either of the modes hereinbefore described, I proceed to mold or fashion it, in the usual manner, into blocks or bricks, tiles, water and drain pipes, statuary, and ornamental or other designs, and then allow the same to dry and harden by exposure to atmospheric air, with or without the aid of a continued heat and moisture. The blocks or devices so formed will harden into stone in from ten to twenty days, varying with the form and the degree of thickness imparted thereto.

Instead of first producing a composition of silicate of lime and sand in a plastic condition, and then molding the same into blocks or other forms, as hereinbefore described, I contemplate producing silicate of lime in blocks, pipes, or other devices, previously molded or formed out of a composition of sand and quicklime, with or without the addition of gypsum, chalk, or other ingredients, and excluding the carbonic acid of the atmosphere from the molded blocks while yet fresh or green, to prevent the conversion of the lime therein into a carbonate, and at the same time keeping them moist or damp to facilitate the production of a silicate therefrom, continuing the treatment for such length of time as may be required to secure the formation of the silicate throughout the mass. This process will be hastened by the application of gentle heat. I prefer, therefore, to carry it into practical operation, and to obtain heat and moisture, and at the same time exclude atmospheric air, by subjecting the fresh blocks of quicklime and sand or lime, sand, and cement to the action of steam, either dry or saturated, in any suitable vessel or chamber. I nevertheless contemplate excluding the air by means of moisture alone, keeping the composition always wet for the purpose, and applying artificial heat separately, as may be found desirable.

I contemplate the combination of cement, either in part or wholly, with lime under the several conditions herein described.

Having thus fully described my invention, I claim therein as new and desire to secure by Letters Patent—

1. An artificial stone or composition for various useful and ornamental purposes formed of silex, in combination with silicate of lime, with or without other ingredients, when produced before the composition has been molded or allowed to dry and harden, substantially in the manner herein set forth.

2. The production of silicate of lime in combination with silex by excluding atmospheric air from a formed or molded mass, block, or device composed of caustic lime and sand, with or without other ingredients, and subjecting the same to moisture, with or without heat, substantially in the manner and for the purpose herein set forth.

3. The application of steam to a composition containing silex or silicious materials and lime, in any form or in any proportions, for the purpose of producing an artificial stone, substantially as herein set forth.

GEORGE E. VAN DERBURGH.

Witnesses:
   JNO. A. SNOOK,
   GEO. A. MAYHEW.